(12) United States Patent
Kirjavainen et al.

(10) Patent No.: US 6,274,071 B1
(45) Date of Patent: Aug. 14, 2001

(54) METHOD AND APPARATUS FOR PREPARING AN EXTRUDABLE PRODUCT, AND AN EXTRUDED PRODUCT

(75) Inventors: Kari Kirjavainen, Espoo; Jyri Järvenkylä, Hollola, both of (FI)

(73) Assignee: Nextrom Holding S.A., Ecublens (CH)

( * ) Notice: Subject to any disclaimer, the term of this patent is extended or adjusted under 35 U.S.C. 154(b) by 0 days.

(21) Appl. No.: 09/142,518

(22) PCT Filed: Apr. 4, 1997

(86) PCT No.: PCT/FI97/00210

§ 371 Date: Sep. 9, 1998

§ 102(e) Date: Sep. 9, 1998

(87) PCT Pub. No.: WO97/37829

PCT Pub. Date: Oct. 16, 1997

(30) Foreign Application Priority Data

| Apr. 4, 1996 | (FI) | 961539 |
| Apr. 29, 1996 | (FI) | 961822 |
| Jun. 20, 1996 | (WO) | PCT/FI96/00359 |
| Dec. 12, 1996 | (FI) | 964989 |

(51) Int. Cl.$^7$ .......................... B29C 47/78; B29C 47/10; B29C 47/06

(52) U.S. Cl. .................. 264/171.13; 264/209.2; 264/211.21; 425/113; 425/133.1; 425/378.1; 425/381

(58) Field of Search ........................ 264/171.13, 171.21, 264/171.27, 171.29, 173.12, 173.16, 209.2, 211.21, 514, 515, 516; 425/378.1, 380, 381, 113, 133.1

(56) References Cited

U.S. PATENT DOCUMENTS 3,289,250 12/1966 Zernay .
3,289,251 12/1966 Daubenfeld .
3,303,251 * 2/1967 Heider et al. .
3,314,108 4/1967 Wienand et al. .
3,490,097 1/1970 Gould .
3,712,783 1/1973 Maxwell ........................... 425/381.2
3,862,868 1/1975 Spillers ................................ 156/244
4,822,548 * 4/1989 Hempel .............................. 264/209.2
5,108,682 * 4/1992 Tompkins et al. .................... 264/167
5,292,472 3/1994 Tompkins et al. .................... 264/173
5,387,386 * 2/1995 Kirjavainen ......................... 264/173
5,393,536 2/1995 Brandt et al. ........................ 425/112
6,013,222 * 1/2000 Douglas et al. ...................... 264/514

FOREIGN PATENT DOCUMENTS 1961078 6/1971 (DE) .
144708 3/1954 (SE) .
9524304 9/1995 (WO) .

* cited by examiner

Primary Examiner—Jan H. Silbaugh
Assistant Examiner—Mark Eashoo
(74) Attorney, Agent, or Firm—Ladas & Parry

(57) ABSTRACT

A method for extruding an extrudable material to form an extruded product, the method including the steps of (a) providing an extruder having a periphery and at least a first stator, an outer rotor and an inner rotor, the first stator being disposed between the outer rotor and the inner rotor to define at least two annular feed gaps disposed one within the other in a radial direction within the periphery of the extruder, a first of the at least two annular feed gaps being defined by the outer rotor and the first stator and being disposed outside of the first stator between the first stator and the outer rotor with the outer rotor being closer to the periphery than the first stator, the first feed gap being the outermost feed gap in the extruder, the extruder including a supply conduit for supplying the material to the first feed gap through the first stator; and (b) supplying the material to the at least two annular feed gaps, with at least a part of the material being supplied through the first stator to the first feed gap, to cause the material to be extruded.

20 Claims, 2 Drawing Sheets

METHOD AND APPARATUS FOR PREPARING AN EXTRUDABLE PRODUCT, AND AN EXTRUDED PRODUCT

FIELD OF INVENTION

The invention relates to a method for preparing an extrudable product, wherein the material to be extruded is pressed in the extruder along at least two annular feed gaps that are placed one within the other in the radial direction and that are provided between a rotor and a stator, the material to be extrudable being pressed from the extruder by rotating the rotors.

The invention further relates to an apparatus for preparing an extrudable product, the apparatus comprising at least two annular feed gaps that are placed one within the other in the radial direction and that are provided between a stator and a rotatable rotor, the material to be extruded being pressed from the extruder by rotating the rotors.

The invention also relates to an extruded product that is radially oriented at least at the outer surface.

BACKGROUND OF THE INVENTION

U.S. Pat. 3,314,108 discloses an extruder where a rotatable rotor is placed inside the frame and a fixed mandrel is further placed inside the rotor, whereupon feed gaps are formed between the rotor and the frame and the rotor and the mandrel, respectively, the material to be extruded being supplied out of the extruder via the feed gaps by rotating the rotor provided with grooves. In such an extruder it is very difficult to control the temperature of the material to be extruded since it can only be performed either via the external frame or the internal mandrel. If the product to be extruded is to be provided with circumferential orientation, a separate orientation tool that is placed after the nozzle must be used in connection with the extruder in question and also with other typical extruders. This kind of an arrangement is disclosed for example in WO 95/24304. Adding such a separate orientation tool naturally makes the apparatus complicated and difficult to use. Further, for example when films are extruded it is necessary to use some other similar difficult rotating arrangement to compensate for the variation in thickness.

DE 1,961,078 discloses an extruder where a rotatable rotor is mounted in bearings inside the frame and where a conical stator is placed inside the rotor, whereupon between the rotor and the stator there is a conical feed gap along which the material to be extruded is pressed out of the nozzle of the apparatus by means of rotor grooves as the rotor rotates. In this case, too, it is difficult to control the temperature of the material to be extruded since the temperature can only be regulated for the part situated inside the feed gap. Further, cooling of the rotor is a considerable problem since the rotor is encased inside the frame. Also, the extruder requires a separate tool placed after the nozzle for the orientation or the compensation of variation in thickness. The structure of the extruder is altogether rather cumbersome and difficult.

The purpose of the present invention is to provide a method and an apparatus where the aforementioned problems can be avoided. Another purpose is to provide an extruded product with very good properties.

SUMMARY OF INVENTION

The method according to the invention is characterized in that the stator is situated between the feed gaps such that outside the outermost feed gap there is a rotor and inside the stator there is at least one rotor.

Further, the apparatus according to the invention is characterized in that the stator is situated between the feed gaps such that outside the outermost feed gap there is a rotor and inside the stator there is at least one rotor.

Also, the extruded product according to the invention is characterized in that the product comprises axial continuous fibers within its material.

The essential idea of the invention is that the extruder comprises at least two annular feed gaps between which there is a fixed stator, and a rotatable rotor is provided outside the outermost feed gap. Inside the stator there is at least one rotatable rotor. The idea of a preferred embodiment is that continuous fibers are supplied through the stator. The idea of another preferred embodiment is that the fibers can also be supplied through the rotatable rotor or a sleeve. Also, the continuous fibers can be stretched by stretching the product to be extruded on which the continuous fibers are supplied.

The invention has the advantage that the product to be extruded can be provided with radial orientation without a separate orientation unit. Another advantage is that for example during the preparation of films the variation in thickness can be compensated for in a very easy and simple manner with the apparatus. Also, it is easy to place heating and cooling means inside the stator so that the temperature of the material to be extruded can be controlled easily and effectively when the means for controlling the temperature are situated between the different layers of the product to be extruded, which is in practice impossible in connection with a conventional extruder. With the apparatus according to the invention it is equally easy to process plastic that is in the form of powder and granulate without changing the structure of the apparatus. Further, when continuous fibers are supplied with the apparatus, it is possible to prepare a very strong product which comprises a radial orientation field and axial continuous fibers as reinforcement.

BRIEF DESCRIPTION OF THE DRAWINGS

The invention will be described in greater detail in the accompanying drawings, in which.

Figure 1:
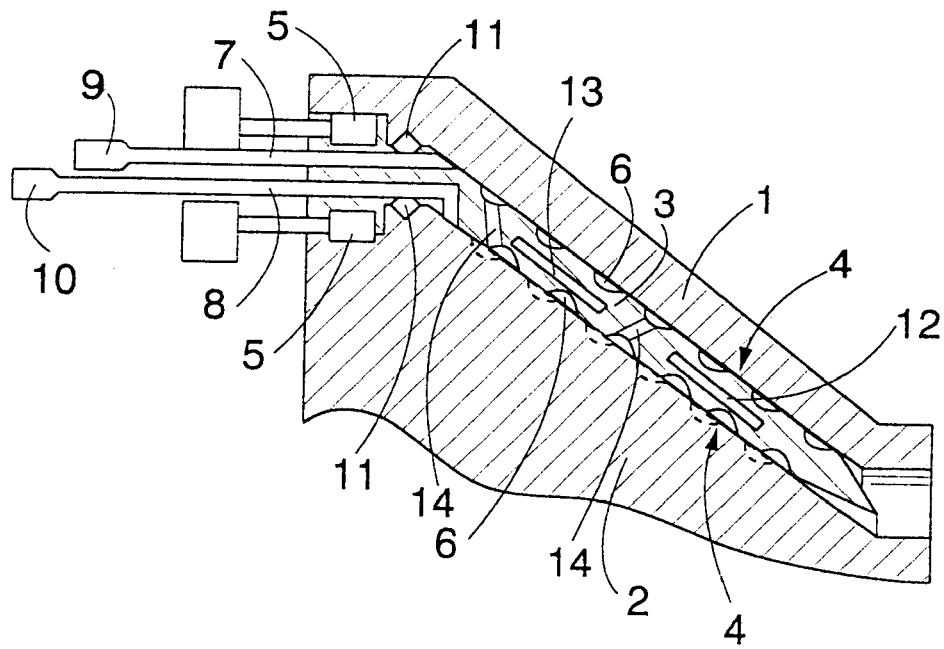
FIG. 1 is a schematic side view, in cross-section, of an apparatus according to the invention.

The apparatus shown in FIG. 1 comprises an outer rotor 1, an inner rotor 2 and between them a stator 3. The stator 3 is conical, and the surface of the outer rotor 1 and the surface of the inner rotor 2 are conical at least on the side of the stator 3, whereupon an annular conical feed gap 4 is formed between the outer rotor 1 and the stator 3 and a corresponding annular conical feed gap 4 is formed between the inner rotor 2 and the stator 3 inside the aforementioned feed gap 4 in the radial direction. Rotating means 5 are placed to rotate the outer rotor 1 and the inner rotor 2. The rotating means 5 comprise a motor and for example cog wheels or a gear system. The motor may be for example a hydraulic motor or an electric motor or some other motor suitable for the purpose and known per se. If the rotating means 5 comprise a gear system, the speed of rotation of the rotors 1 and 2 can be adjusted in a desirable manner with the gear system. On the other hand, for example when an electric motor is used, the gear system is not necessary since the speed of rotation of the rotors 1 and 2 can be adjusted easily by regulating the speed of rotation of the motor in a manner known per se. For each rotor there may be one or several rotating means 5. It is also possible to provide one common rotating means 5 or pair of means to rotate both the outer rotor 1 and the inner rotor 2, whereupon each rotor is rotated with a common cog wheel so that the rotors 1 and 2 would naturally rotate in opposite directions. If each rotor has its own actuator, the directions of rotation of the rotors can naturally be selected to be either the same or opposite. The stator 3 is provided with grooves 6 on each side facing the rotors 1 and 2, so that when the rotors 1 and 2 rotate the material to be extruded is pressed out of the extruder by the effect of the grooves. For example the inner rotor 2 may also comprise grooves that are shown with a broken line in the accompanying figure, so that material having a high molecular weight can also be pressed out of the extruder effectively.

The extruder also comprises a first supply conduit 7 along which the material to be extruded can be supplied between the stator 3 and the outer rotor 1. The material to be supplied to the first supply conduit 7 is fed with a feeding device 9. The feeding device 9 may be for example a feed screw, a pump or some other device known per se. With the feeding device it is possible to adjust the amount of flow of the material to be supplied to the supply conduit. Further, the extruder comprises a second supply conduit 8 along which the material to be extruded can be supplied between the stator 3 and the inner rotor 2. Correspondingly, material is supplied to the second supply conduit 8 with a second feeding device 10. The first supply conduit 7 and the second supply conduit 8 can be easily placed inside the stator 3. It has been proved in the experiments conducted that when the circumference is large it is difficult to provide the extruder with a high capacity. However, it is easy to place several means for supplying material in the apparatus according to the invention via the stator 3. Material can then be supplied from several points in the circumference of the extruder and different materials can be supplied with different feeding devices, if desired. It is also very easy and effective to heat the extruder from the outside temporarily with a gas flame, for example. Gas heating is very accurate and fast and it can be easily utilized with the apparatus according to the invention since the rotation of the outer rotor 1 makes the gas heating directed to the rotor heat it evenly.

The outer rotor 1 and the inner rotor 2 are mounted on the stator 3 with bearings 11. The bearings 11 are placed in such a way that they restrict the movement of the rotors 1 and 2 in both directions in the axial direction of the extruder. The bearings 11 may be conical bearings, for example. Especially due to the fastening of the outer rotor 1 with bearings to the stator 3, it is not necessary to use outside the outer rotor 1 complicated and heavy support structures that would hamper the cooling of the outer rotor 1, for instance.

The stator 3 may comprise heating means 12, for example electric resistors, so that the material to be extruded can be heated mainly from the middle of the material via the stator 3, and the heating is therefore effective. Correspondingly, there may also be cooling means 13 placed inside the stator so that cooling can also be performed rapidly and effectively, i.e. the temperature of the extruder can be controlled efficiently. It is important to accurately control the temperature for example in the extrusion of certain sensitive materials where a low temperature can be maintained in the initial section of the screw by means of the cooling means 13. Such materials include, for example, polyethylenes having a high molecular weight and containing absorbed cross-linking peroxide that is not intended to react inside the extruder. Several cooling means 13 may be placed one after another in the axial direction such that the extruder comprises several separate cooling sections provided one after another in the axial direction. In the experiments conducted the capacity of the extruder was increased with intensive cooling of the supply section in the extruder.

By rotating the outer rotor 1 and the inner rotor 2 it is easy to provide the outer and the inner surface of the product to be extruded with radial orientation with the apparatus of FIG. 1. The material of the product may also contain staple fibers so that the radial orientation can be made more effective. The rotors 1 and 2 can also be easily arranged to rotate non-cyclically so that smaller tolerances can be achieved for example in the manufacture of thin films since the accumulation of variation in thickness can be avoided.

The stator 3 may comprise openings 14 through it, so that some of the material to be extruded can flow through the openings 14 from one side of the stator 3 to the other. By means of the openings 14 it is possible to balance the pressure differences possibly occurring on different sides of the stator 3 and the material to be extruded can also be mixed effectively.

Figure 2:
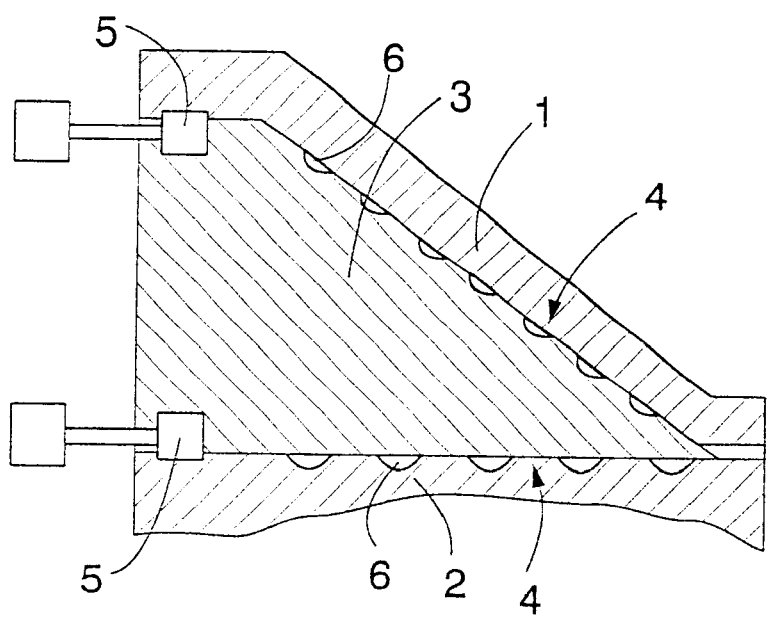
FIG. 2 is a schematic side view, in cross-section, of another apparatus according to the invention.

FIG. 2 is a schematic side view, in cross-section, of another apparatus according to the invention. The reference numerals in FIG. 2 correspond to those of FIG. 1. For the sake of clarity, FIG. 2, as well as subsequent FIGS. 3 and 4, does not show heating or cooling means, feeding devices, supply conduits or bearing arrangements of rotors. The surface of the stator 3 on the side of the inner rotor 2 is cylindrical and the inner rotor 2 is correspondingly entirely cylindrical. The outer surface of the stator 3 and the outer rotor 1 may also be cylindrical, but the feed gaps between the stators and the rotors are most preferably conical, so that the spirals formed by the grooves 6 can be placed in the axial direction over a distance that is shorter than in a cylindrical extruder. The grooves 6 of the feed gap 4 situated between the stator 3 and the inner rotor 2 are placed inside the feed gap 4 in the inner rotor 2. It is considerably easier to provide the grooves 6 outside the rotor 2 than inside the stator 3. It has also been found out in the experiments conducted that the best capacity for the extruder is achieved when the rotors also comprise grooves 6 at least over a section thereof.

Figure 3:
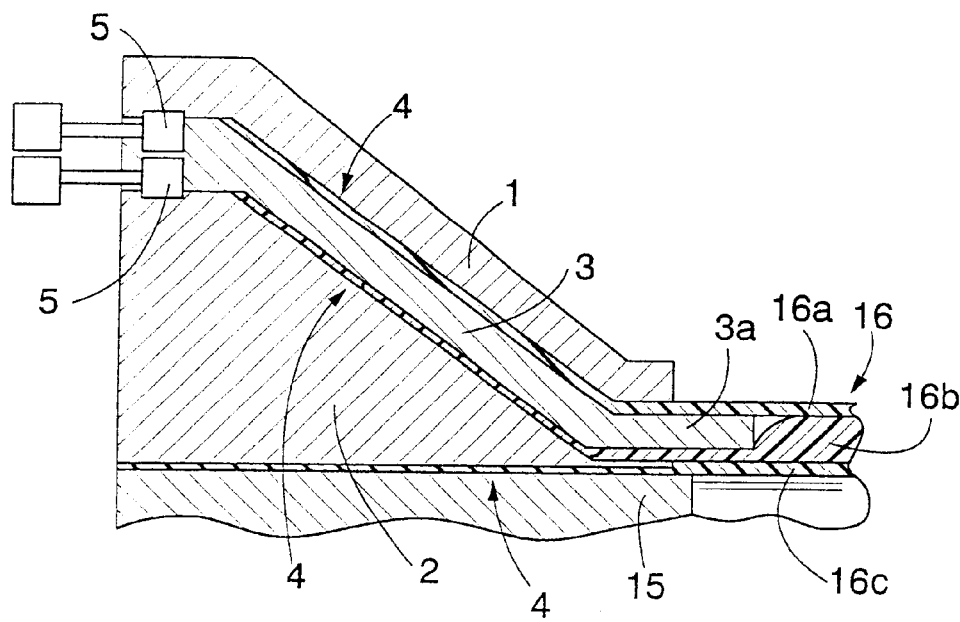
FIG. 3 is a schematic side view, in cross-section, of a third apparatus according to the invention.

FIG. 3 is a side view, in cross-section, of a third apparatus according to the invention. The reference numerals in FIG. 3 correspond to those of FIGS. 1 and 2. For the sake of clarity, FIGS. 3 and 4 do not show the grooves provided in the rotor and/or the stator. Inside the inner stator 2 there is a fixed inner core 15 so that material to be extruded can also be supplied along the feed gap 4 situated between the inner rotor 2 and the inner core 15 to provide a three-layer extruded product 16. The product 16 may be for example a pipe, a film, a cable sheath or some other similar product. The outer layer 16a of the product 16 is pressed along the feed gap 4 situated between the outer rotor 1 and the stator 3, the middle layer 16b is pressed along the feed gap 4 between the inner rotor 2 and the stator 3, and the inner layer 16c is correspondingly pressed along the feed gap 4 between the inner rotor 2 and the inner core 14. The end of the stator 3 comprises an extension 3a that provides an empty space which is slowly filled by the foamed middle layer 16b.

Figure 4:
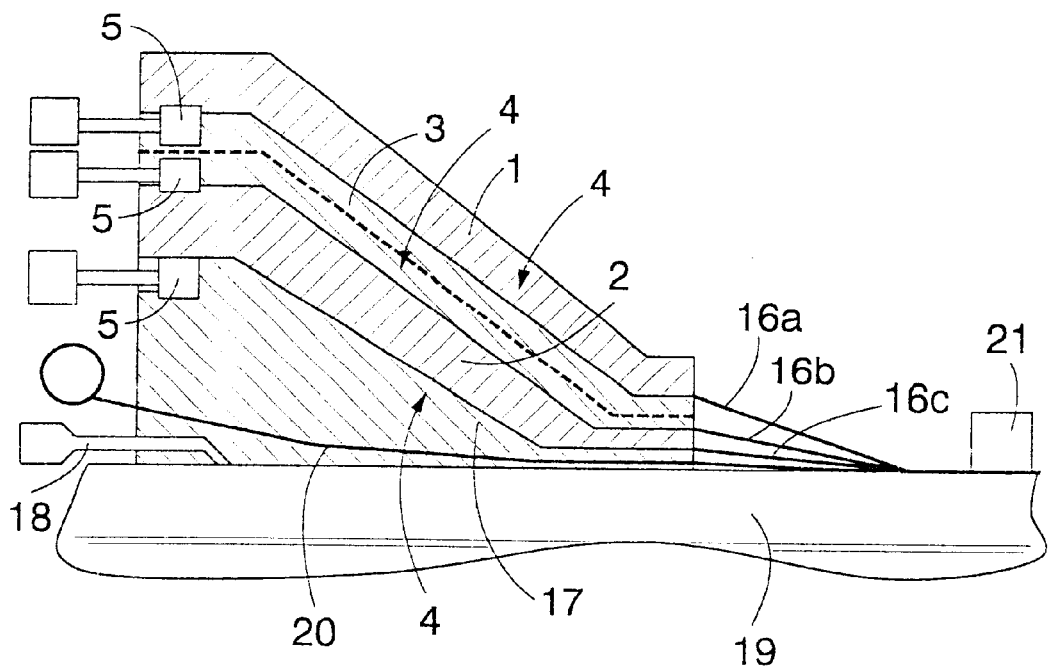
FIG. 4 is a schematic side view, in cross-section, of a fourth apparatus according to the invention.

FIG. 4 is a side view, in cross-section, of a fourth apparatus according to the invention. The reference numerals in FIG. 4 correspond to those of FIGS. 1 to 3. Inside the inner rotor 2 there is a sleeve 17. The sleeve 17 may be either fixed or it can be rotated with the rotating means 5. The extruder of FIG. 4 is arranged to coat a product 19 to be coated. The product 19 to be coated may be, for example, a cable or a pipe to be coated. The extruder further comprises supply means 18 with which a new layer of plastic or protective gas, for example, can be supplied between the sleeve 17 and the product 19 to be coated or negative pressure can be formed in the aforementioned space through sucking. The sleeve 17 is provided with axial openings for supplying continuous fiber 20, such as optical fiber used in optical cables, through the sleeve 17. If the sleeve 17 is fixed, the continuous fiber 20 is supplied axially on the product 19 to be coated. If the sleeve 17 is rotated with the rotating means 5, the continuous fiber 20 can be wound on the product 19 to be coated. If desired, the direction of rotation of the sleeve 17 can be varied so that the direction in which the continuous fiber 20 is wound can be altered. The continuous fiber 20 can also be arranged to be supplied through the stator 3, which is shown in FIG. 4 with a broken line. In such a case, the continuous fiber 20 remains within the mass to be extruded. The continuous fiber 20 may also be some fiber that is suitable as reinforcement. The continuous fibers 20 or staple fibers possibly provided in the material or both of the fiber types can be electrically conductive at least partly or at their surface, for instance. The product can thus be provided with a conductive network, for example when the fibers come into contact in some points. This conductive network can be utilized to provide similar effects as described in the Applicant's patent application PCT/FI96/00359, which is incorporated herein by reference. The middle layer 16b may be made of, for example, plastics waste or foam or some other similar material. The inner layer 16c may be for example an adhesive layer with which the outer layers can be made to stick onto the product 19 to be coated.

The extruder further comprises a pulling device 21 with which the product can be stretched and thus provided with extension and axial orientation. For example continuous fiber 20 can be stretched from 0 to 600% through the product. The final stretching can be adjusted for example by regulating the negative pressure produced by the supply means 18, so that the ratio between the tension acting on the fibers and the negative pressure determines the place where the coatings are lowered onto the surface of the product to be coated. By supplying for example protective gas with the supply means 18 between the product 19 to be coated and the sleeve 17 it is possible to provide, for instance, a cable with a strong sheath that is not substantially attached to the cable. The stretching of the product is also important since certain fiber-like polymer reinforcements lose their effect when heated unless they are subjected to tension.

It is easy to fasten for example reels outside the outer rotor 1, used to provide for instance a cable to be coated with helical outer armouring made of continuous fiber. If desired, the winding direction of the armourings can also be varied at times.

The drawings and the related description are only intended to illustrate the inventive idea. The details of the invention may vary within the scope of the claims.

What is claimed is:

1. A method for extruding an extrudable material to form an extruded product, said method comprising
   (a) providing an extruder comprising a periphery and at least a first stator, an outer rotor and an inner rotor, said first stator being disposed between the outer rotor and the inner rotor to define at least two annular feed gaps disposed one within the other in a radial direction within the periphery of the extruder, a first of said at least two annular feed gaps being defined by the outer rotor and the first stator and being disposed outside of the first stator between the first stator and the outer rotor with the outer rotor being closer to the periphery than the first stator, said first feed gap being the outermost feed gap in the extruder, said extruder comprising supply conduit means for supplying the material to the first feed gap through the first stator; and
   (b) supplying the material to the at least two annular feed gaps, with at least a part of the material being supplied through the first stator to the first feed gap, to cause the material to be extruded.

2. A method according to claim 1, wherein continuous fibers are supplied through the first stator.

3. A method according to claim 2, wherein the extruder comprises a sleeve inside the inner rotor, the continuous fibers being supplied through the sleeve.

4. A method according to claim 3, comprising rotating the sleeve.

5. A method according to claim 2, comprising stretching the continuous fibers by pulling the extruded product.

6. A method according to claim 1 comprising providing thermal power to the extruder from inside the extruder, the thermal power provided from inside the extruder being greater than thermal power provided from outer surfaces of the extruder.

7. A method according to claim 1 comprising providing the extruder with cooling means for cooling the extruder and cooling the extruder with said cooling means.

8. A method according to claim 7, wherein the cooling means comprises a plurality of separate cooling sections that are disposed one after another in an axial direction in the extruder.

9. An extruder for extruding material to form an extrudable product, said extruder comprising an extruder comprising a periphery and at least a first stator, an outer rotor and an inner rotor, said first stator being disposed between the outer rotor and the inner rotor to define at least two annular feed gaps disposed one within the other in a radial direction within the periphery of the extruder, a first of said at least two annular feed gaps being defined by the outer rotor and the first stator and being disposed outside of the first stator between the first stator and the outer rotor with the outer rotor being closer to the periphery than the first stator, said first feed gap being the outermost feed gap in the extruder, said extruder comprising supply conduit means for supplying the material to the first feed gap through the first stator.

10. An apparatus according to claim 9, wherein the outer rotor forms the periphery of the extruder.

11. An apparatus according to claim 10, wherein the outer rotor is mounted in bearings substantially only on the first stator.

12. An apparatus according to claim 9, wherein said inner and outer rotors or said first stator comprise groove means for supplying the material for extrusion as the rotors rotate.

13. An apparatus according to claim 9, wherein at least one of the inner and outer rotors comprises groove means for pressing the material out of the extruder.

14. An apparatus according to claim 9, wherein each of the inner and outer rotors and the first stator comprises groove means for pressing high molecular weight material out of the extruder.

15. An apparatus according to claim 9, wherein at least the outermost feed gap is conical.

16. An apparatus according to claim 15, wherein each of the at least two annular feed gaps is conical.

17. An apparatus according to claim 9, wherein the extruder comprises means for supplying continuous fibers through the first stator.

18. An apparatus according to claim 9, wherein the extruder comprises a sleeve disposed inside the inner rotor and means associated with the sleeve for supplying continuous fibers through the sleeve.

19. An apparatus according to claim 18, wherein the extruder comprises means for rotating the sleeve.

20. An apparatus according to claim 19, wherein the extruder comprises pulling means for stretching the product and thereby the continuous fibers.

* * * * *